H. W. TRUE.
FUEL SUPPORT.
APPLICATION FILED NOV. 19, 1906.

1,002,012.

Patented Aug. 29, 1911.

WITNESSES
Irving U. Townsend
Jesse A. Holton.

INVENTOR
HENRY W. TRUE
BY
Emery and Booth
ATTYS.

UNITED STATES PATENT OFFICE.

HENRY W. TRUE, OF CAMBRIDGE, MASSACHUSETTS.

FUEL-SUPPORT.

1,002,012.  Specification of Letters Patent.  Patented Aug. 29, 1911.

Application filed November 19, 1906. Serial No. 343,951.

*To all whom it may concern:*

Be it known that I, HENRY W. TRUE, a citizen of the United States, and resident of Cambridge, in the county of Middlesex and State of Massachusetts, have invented an Improvement in Fuel-Supports, of which the following description, in connection with the accompanying drawings, is a specification, like letters on the drawings representing like parts.

My invention relates to improvements in fuel supports and especially in such as are used in so-called gas producers or gas apparatus in which the gas is produced for immediate consumption, and at a rate proportioned to such consumption. It is to be understood, however, that my invention is not limited to such use but may be employed in other connections, such as in ordinary heating furnaces and the like.

In order that the principles of the invention may be clearly understood I have shown one type or embodiment of the invention in the accompanying drawing, wherein—

Figure 1:
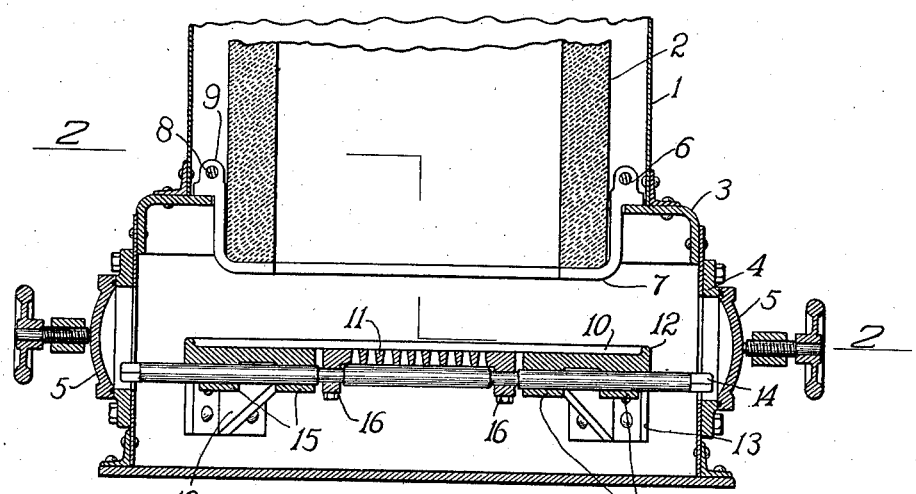
Figure 2:
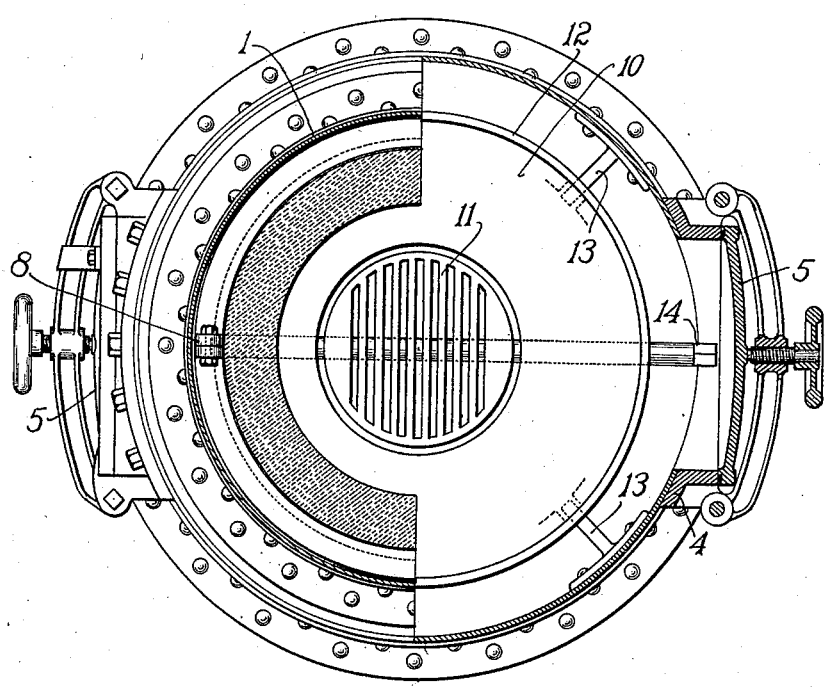

Figure 1 is a vertical, central section of the lower portion of a gas producer and of a fuel support embodying one type of my invention; and Fig. 2 is a horizontal, sectional view through the combustion chamber and showing the fuel support in plan, a portion of the right hand half thereof being omitted that the construction of the support may be more clearly shown.

In the single type or embodiment of my invention herein selected for illustration, the gas producer in connection with which the invention is herein shown, consists generally of an outer, preferably metallic, shell 1 and a combustion chamber 2 of suitable material, preferably spaced from the outer shell, suitable packing being interposed if desired between said shells. The shell 1 is herein shown as supported at its lower end upon an annular base portion 3, extending upward from the ash pit 4, which may be of any desired construction and preferably provided with doors 5 of suitable construction and oppositely disposed. Supported upon a herein shown as inwardly projecting portion of the base portion 3 is a preferably two-part, depending ring 6 the lower inturned portion 7 whereof is adapted to receive thereon the annular wall forming the combustion chamber. The ring 6 may be composed of any suitable number of parts having uniting means such as bolts 8, passing through ears 9 upon adjoining sections.

The outer supporting plate 10, as herein shown, is located below the combustion chamber 2 and within the ash pit 4 and of a diameter very considerably exceeding that of the combustion chamber and extending substantially to the wall of the outer casing or shell 1 but is spaced at all points from the surrounding wall. By this construction an ample support is afforded for the burning fuel and, at the same time, provision is thus made for an inner and preferably tilting grate member 11, of large diameter. Thus the fuel support as an entirety is composed of an outer, annular member, herein shown as imperforate, and provided with an encircling rim 12, although it is apparent that such member may be of any suitable construction, and an inner, preferably perforated and tilting grate. The supporting plate 10 is herein shown as supported upon a plurality of brackets 13, so that a rotative or oscillating movement in the plane of said member may be imparted thereto in any suitable manner, and, in the present instance, by means of a rod of any suitable type, loosely mounted in sockets 15 in said supporting plate 10. In the present instance the rod 14 is shown as extending laterally through and beyond said supporting plate 10 and within convenient distance of the doors 5, and as provided with squared or similar ends for the application of a shaker or tool, whereby said supporting plate 10 may be oscillated or rotated in the plane thereof by the application of the shaker or tool to either end and operation thereof in such manner as to shift said rod in a horizontal plane through a suitable arc. It is apparent that if desired the rod 14 may be merely of sufficient length to support the grate member 11 for tilting movement or that it need not be so extended as to be accessible at either end. It will be observed that in the present type of the invention the supporting plate 10 is non-tilting but that when the described movement is imparted thereto the fuel may be effectively shaken and that ashes may pass to the ash pit between the periphery of said member and the surrounding wall. The grate member 11, herein shown as located in the same horizontal plane as the supporting plate 10, is preferably mounted for dumping or tilting movement upon the rod 14 and for that purpose is shown as provided with a plurality of bearings 16 in which said rod 14 is tightly journaled, so that said grate member 11 partakes of the rocking or tilting movement of said rod 14. If desired, the bearings 16 may each be composed of a plurality of parts bolted or otherwise secured together to facilitate the assembling of the rod and the grate members, or that any suitable manner of assembling the parts may be resorted to. It is apparent that the grate member 11 may be imperforate or provided with bars, or otherwise constructed to present a perforated fuel receiving surface.

In operation the fuel support as an entirety may be oscillated through a suitable arc in the horizontal plane thereof by the application of a suitable tool or shaker to either end of the rod 14, and, by the same tool or shaker, a rocking or tilting movement may be imparted to said rod and therefore to the grate member 11. The fuel support herein represented presents a supporting surface of large diameter, having centrally thereof a tilting grate. By the actuation of the grate the fire is drawn toward the center of the combustion chamber and, by the oscillation of the entire fuel support, the ashes may be ejected about the perimeter of the plate 10. In the preferred operation of the device the space between the lower edge of the combustion chamber and the fuel support is occupied by ashes, the body of the burning fuel being preferably confined within the combustion chamber.

Having thus described one type or embodiment of my invention, I desire it to be understood that although specific terms are employed, they are used generically or in a descriptive sense, and not as terms of limitation, the scope of the invention being set forth in the following claims.

Claims.

1. A stove or furnace comprising in combination a combustion chamber, an ash pit located below the same and of greater diameter than said combustion chamber, and a fuel support positioned in said ash pit and extending as an entirety laterally beyond the combustion chamber, thereby to provide a fuel receiving surface having a diameter materially exceeding that of the combustion chamber, said fuel support comprising an outer, non-tilting, annular, fuel receiving plate having a rotative shaking movement in its own plane, and a grate pivoted within said annular plate and having means to tilt the same.

2. A stove or furnace comprising in combination a combustion chamber, an ash pit located below the same and of greater diameter than said combustion chamber, and a fuel support positioned in said ash pit and extending as an entirety laterally beyond the combustion chamber, thereby to provide a fuel receiving surface having a diameter materially exceeding that of the combustion chamber, said fuel support comprising an outer, imperforate, non-tilting, annular, fuel receiving plate 10 having a rotative shaking movement in its own plane, a tilting, perforated grate 11 mounted within said annular plate and normally positioned in the plane of said annular plate, and means to tilt said grate and impart rotative shaking movement to said fuel receiving plate and grate.

3. A stove or furnace comprising in combination a combustion chamber, an ash pit located below the same and of greater diameter than said combustion chamber, said ash pit having opposite openings, a fuel support positioned in said ash pit and having a diameter materially exceeding that of the combustion chamber, said fuel support comprising an outer, annular, imperforate, non-tilting, fuel receiving plate 10 having an upstanding rim 12, a perforated rocking grate 11 mounted within said plate 10 and having its upper face in substantially the plane of the upper face of said plate, and a shaking and rocking rod 14 having opposite ends accessible through said ash pit openings.

In testimony whereof, I have signed my name to this specification, in the presence of two subscribing witnesses.

HENRY W. TRUE.

Witnesses:
 IRVING U. TOWNSEND,
 THOMAS B. BOOTH.

Copies of this patent may be obtained for five cents each, by addressing the "Commissioner of Patents, Washington, D. C."